United States Patent [19]

Iacono et al.

[11] 4,236,787
[45] Dec. 2, 1980

[54] OPTICAL FIBER CONNECTOR

[75] Inventors: Frederick D. Iacono, Crestwood; Louis Danielle, Yonkers, both of N.Y.

[73] Assignee: Kings Electronics Co., Inc., Tuckahoe, N.Y.

[21] Appl. No.: 3,299

[22] Filed: Jan. 15, 1979

[51] Int. Cl.³ .............................................. G02B 5/14
[52] U.S. Cl. .............................................. 350/96.21
[58] Field of Search ............... 350/96.20, 96.21, 96.22

[56] References Cited

U.S. PATENT DOCUMENTS

| | | | |
|---|---|---|---|
| 3,734,594 | 5/1973 | Trambarulo | 350/96.21 |
| 3,880,452 | 4/1975 | Fields | 350/96.21 |
| 3,982,815 | 9/1976 | Nakayama | 350/96.21 |
| 4,097,129 | 6/1978 | Wellington et al. | 350/96.21 |
| 4,105,285 | 8/1978 | Bedgood et al. | 350/96.21 |

*Primary Examiner*—Stewart J. Levy
*Attorney, Agent, or Firm*—Bierman & Bierman

[57] ABSTRACT

A connector is provided to align two optical fiber cables with one another so that a light signal may be transmitted from one to the other with minimum loss. One section of the connector has a tapered elastic member in the form of a compressible cone in which the opposed ends of the two optical fiber cables are positioned. After the two sections of the connector are physically united, a cone lock supported from the other section of the connector is moved over the compressible cone, collapsing the latter about the adjacent optical fiber ends and sealing the resultant aligned connection from external influences.

8 Claims, 8 Drawing Figures

FIG. 3
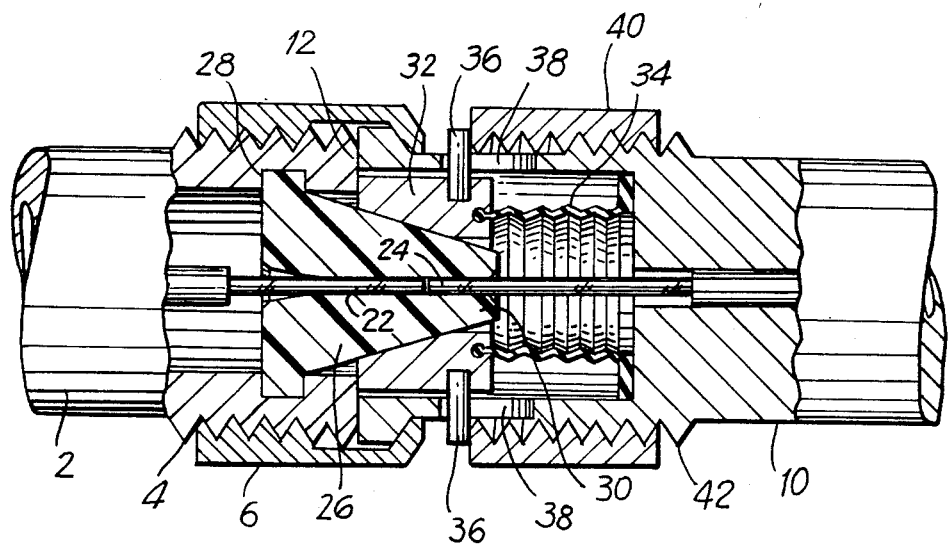
FIG. 4
FIG. 5
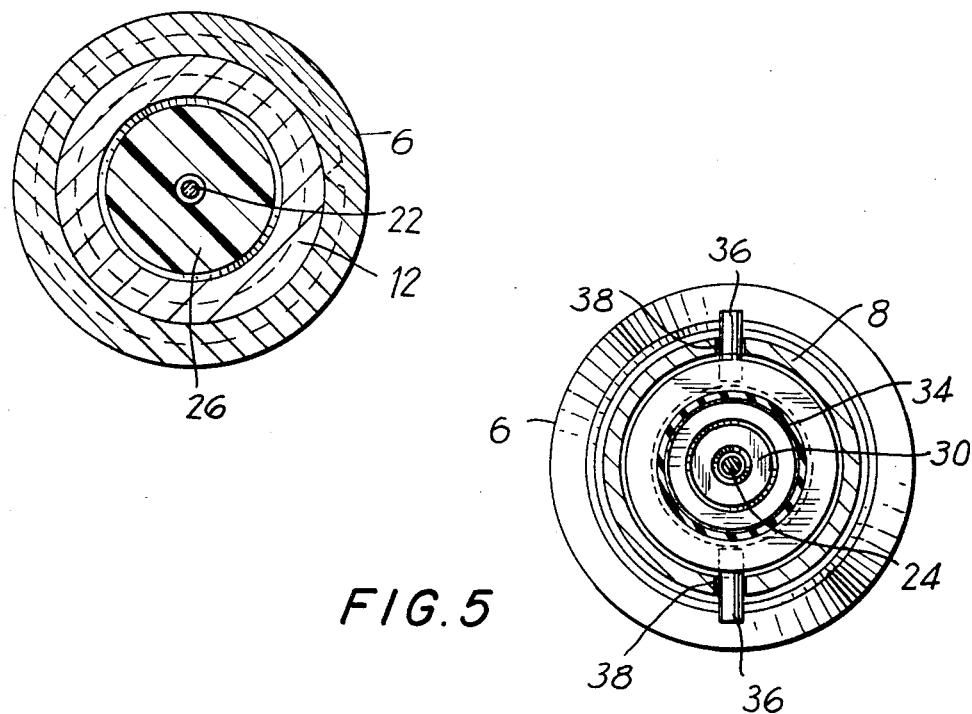

OPTICAL FIBER CONNECTOR

The increased amount of traffic that communications have been required to handle has led to the rapid development of optical communication systems operating around $10^{15}$ Hz, making use of optical fibers in place of metallic transmission media such as coaxial cables. Because of the particular problems associated with this type of transmission, the "hardware", including, for example, connectors previously used with more conventional communication systems, has had to be completely redesigned; without the proper hardware, there can never be a truly practical system.

This invention is directed to one important hardware item, i.e., a connector for joining two optical fiber lines. Such a connector must not only externally shield the connected fibers from all outside influences, but must also properly align the adjacent ends of the two optical fiber cables to insure a minimum transmission loss at this juncture.

It is accordingly the primary object of this invention to provide a connector for optical fiber cables which combines ease of assembly with assurance of alignment of the adjacent optical fiber cable ends.

Another object of this invention is to provide such a connector with means sealing the connected fibers from extraneous outside influences.

A further object of this invention is the providing of a novel connector for an optical fiber cable in which the physical joining of the two connector sections and the alignment of the cable ends within the assembled connector are effectively two independent functions, resulting in not only ease of assembly and disassembly of the completed connector, but also ease and assurance of alignment of the cable ends.

Resulting from the foregoing objects, the present invention provides a novel optical fiber cable connector where two connector sections are first completely physically joined prior to alignment of the fibers within the connector.

These and other objects and advantages of the present invention will more clearly appear from the following detailed description thereof with reference to the accompanying drawings in which:

FIG. 3 is again the same view of the aforesaid connector showing the adjacent ends of the optical fiber cables in proper alignment;

FIG. 4 is a transverse cross-sectional view of the female section of the connector, taken along the line 4—4 of FIG. 1;

FIG. 5 is a transverse cross-sectional view of the male section of the connector, taken along the line 5—5 of FIG. 1;

Figure 1:
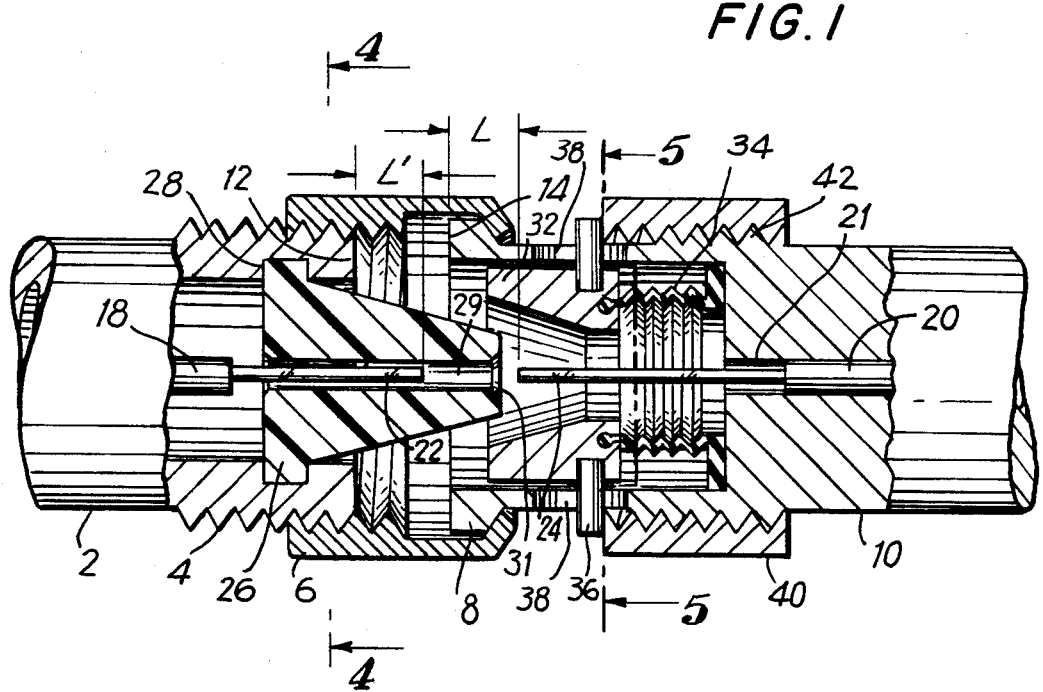
FIG. 1 is a longitudinal cross-sectional view of a preferred form of optical fiber cable connector, showing the two connector sections in an initial connecting stage.
Figure 2:
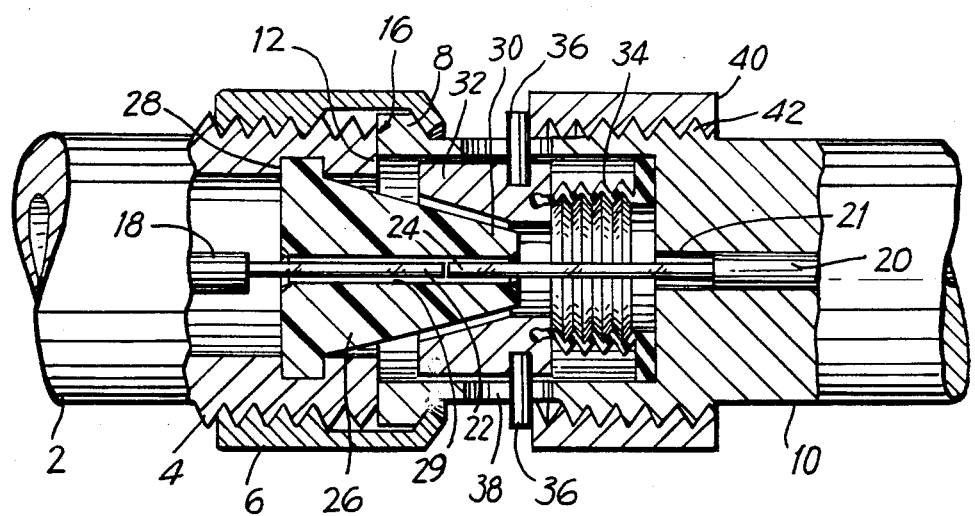
FIG. 2 is the same view of the aforesaid connector with the two connector sections completely physically united.

The connector as illustrated in FIG. 1 is of generally conventional outside appearance, the plastic or metal casing 2 of the female section being formed at its connecting end with external threads 4 adapted to be engaged by the internally threaded ring 6 rotatably attached to the end flanged portion 8 of the casing 10 of the male section. Rotation of ring 6 connects or disconnects the two connector sections. In FIG. 2 the connector is shown as fully clamped together with abutting ends 12 and 14 of the respective connector sections meeting at 16.

The opposed optical fiber cables 18 and 20 to be connected are suitably supported as in central opening 21 of connector casing 10 (the female connector section will be similarly constructed) with the respective optical fiber ends 22 and 24 protruding toward one another as shown.

In forming an optical fiber connection, it is extremely important not only that the final gap between the opposed ends be as small as possible, but that in no event should they overlap and become misaligned. In the connector according to the present invention the danger of overlap and consequent misalignment can be avoided by providing two separate datum distances, the first shown as L being the distance from abutting end 14 of the male connector section to the end of optical fiber 24, and the second the distance L' from the abutting end 12 of the female connector section to the protruding end of optical fiber 22. It is generally desirable to have a spacing between the ends of the two fibers approximately five-thousandths of an inch. If the difference between the aforesaid datum distances L and L' is set at such an amount, when the two connector sections are physically joined as shown in FIG. 2, the desired optical fiber separation will be obtained. Datum distances L and L' can be determined by suitable gauges of the type known in the prior art.

The two sections of the connector having been physically joined by rotation of ring 6 and in the position shown in FIG. 2, final alignment of the spaced end of the two optical fiber cables is then effected. To this end, the female connector is provided with a longitudinally extending frusto-conical member 26 made of resilient compressible material such as rubber or plastic whose base 28 is supported as by an appropriate circumferential internal notch within the casing 2 of the female section of the connector. The forward end 30 of member 26 projects beyond the end of casing 2 toward the male section of the connector. A central bore 29 receives and surrounds optical fiber 22 and is adapted to receive and surround the optical fiber 24. To assist in guiding optical fiber 24 into bore 29, the latter is preferably chamfered as indicated at 31.

At the connecting end, the male section of the connector is provided with a cone lock 32 preferably formed as a metal annulus or cylinder whose inner surface is outwardly flared in correspondence to the tapered projecting end of frusto-conical member 26. Cone lock 32 is supported within casing 10 by a seal gasket 34 in the form of a bellows shown as made of rubber, although a flexible metallic bellows is equally suitable. In its relaxed state, gasket 34 tends to pull cone lock 32 away from the open end of the male section of the connector. Diametrically opposed pins or stops 36 slidably mounted in corresponding opposed slots 38 in the end portion 8 of casing 10 of the male section, control longitudinal movement of cone lock 32, as hereinafter described.

The positioning of the various elements of our connector, with the initial stage shown in FIG. 1, and the locked stage in FIG. 2, has been previously described. The fully locked and aligned position is shown in FIG. 3. This position is effected by providing an internally threaded ring 40 engaging external threads 42 on the outer surface of casing 10, which, upon rotation, acts upon stops 36 to move cone lock 32 forwardly against the resistance of gasket 34 until, as shown in FIG. 3, the cone lock acting upon the outer surface of frusto-conical member 26, has squeezed the same inwardly about the opposed and adjacent optical fibers 22 and 24 to both hold them in place and properly align them. In this manner, not only are the two fiber optical cables securely physically connected but proper alignment producing minimum transmission loss is assured.

Disconnection of the two cables is readily effected by first reversing the rotation of ring 40, cone lock 32 being retracted under the resilient action of gasket 34, and then physically releasing the two connector sections by rotation of ring 6, in a conventional manner.

The final connected position of the parts as shown in FIG. 3 not only provides a strong physical and aligned connection, but as is apparent from this figure the connection itself is sealed from outside influences, with gasket 34, cone lock 32 and frusto-conical member 26 forming a tight joint about the ends of the opposed optical fiber cables.

Figure 6:
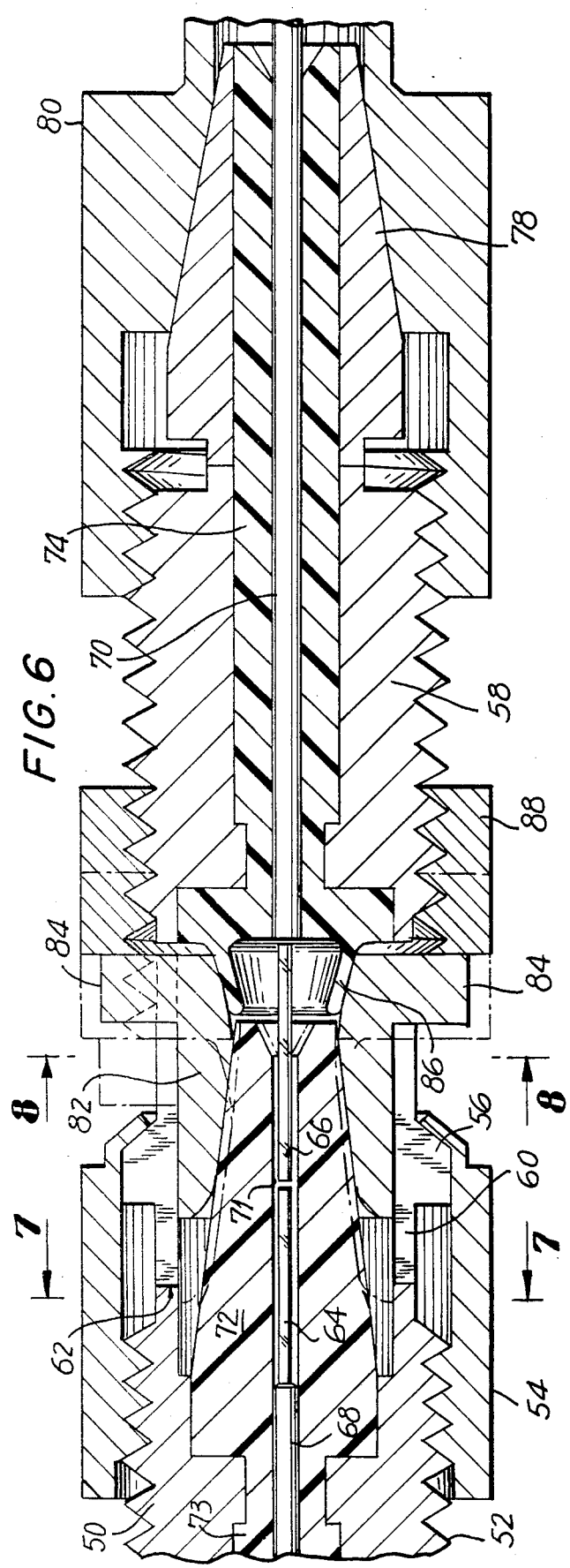
FIG. 6 is a longitudinal cross-sectional view of a modified form of optical fiber cable connector showing the connector sections completely physically united, but with the optical fiber cable ends not yet aligned.
Figure 8:
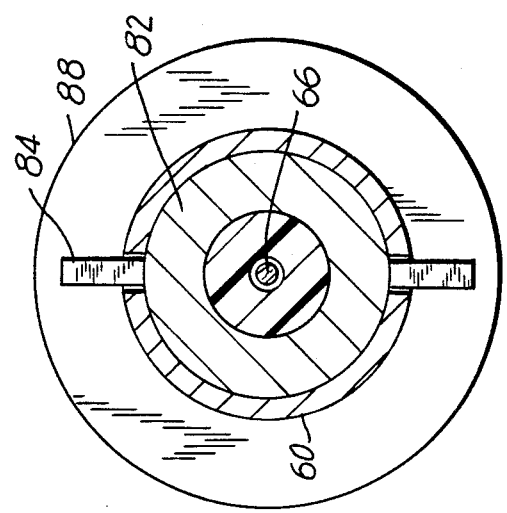
FIG. 8 is a transverse cross-sectional view of the male section of the connector shown in FIG. 6, taken along the line 8—8.
Figure 7:
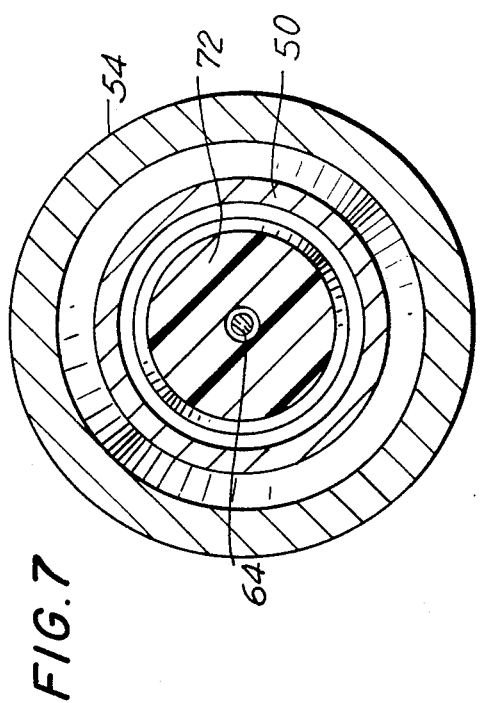
FIG. 7 is a transverse cross-sectional view of the female section of the connector shown in FIG. 6, taken along the line 7—7.

The form of invention illustrated in FIGS. 6, 7 and 8 follows the same general principles as that shown in FIGS. 1-5. The position of the parts in FIG. 6 is with the two connector sections fully physically joined but with the cone lock not yet in position, similar to the position of the parts in FIG. 2. Again the casing 50 of the female connector section is provided with external threads 52 for receiving internally threaded locking ring 54 rotatably mounted on flange 56 near the end of casing 58 of the male section of the connector. In this form of invention, however, casing 58 projects beyond flange 56 to form an abutting end 60 meeting the end of casing 50 at 62. Opposed optical fibers 64 and 66 of the optical fiber cables 68 and 70 to be connected meet within the bore 71 of the compressible frusto-conical member 72. Spacing of the opposed ends of optical fibers 64 and 66 is determined as before from the abutment ends of casings 50 and 58 respectively, in this case represented by the abutment line 62.

In this form of invention, the optical fiber cables are positioned within their respective casing by compressible sleeves 73 and 74 within casing bores, the frusto-conical section 72 in this case being an integral extension of sleeve 73. As shown with respect to the optical fiber 66 projecting from the male connector, when the optical fiber end has been properly positioned with reference to its datum line, it is then held in this position by a rigid frusto-conical clamp 78 compressing sleeve 74 by the tightening of a surrounding ring 80 externally threaded on casing 58. A similar arrangement on the female connector section (not shown) is used to clamp optical fiber 64 in its initially correct position.

The aforesaid and other suitable cable clamping arrangements which do not form part of the present invention may be used, not only with reference to the form of invention shown in FIGS. 6-8 inclusive, but also with the invention of FIGS. 1-5 inclusive.

For the purpose of finally aligning the two opposed optical fiber ends, there is provided a cone lock 82 having a tapered central opening generally conforming to the tapered outer diameter of compressible member 72. At its rear end, this cone lock is formed with integral outwardly extending diametrically opposed extensions 84. The end 60 of casing 58 is formed as an externally threaded split ring as more clearly shown in FIG. 8, the space formed by the split forming a guiding channel for these extensions. In its normal position as part of the male section of the connector, cone lock 82 is internally supported on ring-shaped flexible extensions 86 projecting from the end of compressible cable support 24 whose upward thrust tends to hold cone lock 82 in a retracted position. Internally threaded ring 88 abuts extensions 84 and upon rotation in the direction of the female section of the connector moves cone lock 82, thus compressing the frusto-conical sleeve 72 about the opposed optical fiber ends and aligning them in the same manner as previously described with reference to FIGS. 1-5. The final aligned connection is sealed from outside influences by the inner surface of cone lock 82 cooperating with the end of frusto-conical member 72 on the one hand and the flexible extension 86 on the other hand.

While we have described in detail two embodiments representing proposed embodiments of the invention, it will be clear to those skilled in this art that variations thereof can be made and such variations will still fall within the scope of the invention. The means for sealing the final connections illustrated in the form of a bellows in FIGS. 1-5 could be substituted by any suitable form of resilient expandable sealing means such as a spring-loaded slidable mechanism. The threaded ring connector illustrated for externally physically interconnecting the two connector sections is conventional and could be substituted by other conventional external connecting devices. The specific arrangement for holding the respective optical fiber cables within each connector half is solely illustrative and could be substituted by other conventional means.

The above and other modifications as may occur to those skilled in this art are deemed to fall within the scope of this invention as defined by the claims which follow.

We claim:

1. A connector for optical fiber cables comprising male and female connector sections fixedly supporting opposed ends of the cables: to be connected in which said female section includes an externally threaded cylindrical casing and said male section includes a cylindrical casing having at one end a rotatable internally threaded cylindrical ring adapted to engage said externally threaded casing for pulling said sections into tight contact, the improvement comprising a frusto-conical elastic member having a central opening therethrough adapted to receive one end of an optical fiber cable, the base of said frusto-conical elastic member being radially supported within the casing of said female section with its tapered end projecting beyond the female section in the direction of the male section, means within said male section holding the end of a second optical fiber cable in alignment with the central opening in said frusto-conical elastic member, the respective ends of said fiber optical cables being so positioned within said male and female sections that when said sections are pulled into tight contact, the end of said second optical fiber cable enters the central opening of said frusto-conical elastic member to a depth placing it in close contact with the end of the first optical fiber cable, and means supported by said male section for radially compressing said frusto-conical elastic member inwardly about the adjacent ends of the two optical fiber cables after the male and female sections are in tight contact with each other.

2. A connector according to claim 1, in which said radial compressing means comprises a rigid annulus having a tapered internal diameter corresponding to but eventually smaller than the external diameter of said frusto-conical elastic member, means positioning said annulus for longitudinal movement within the casing of said male section, and means for moving said annulus toward said frusto-conical elastic member to urge the internal surface of said annulus against the external surface of said frusto-conical elastic member, whereby the latter is inwardly compressed about the adjacent ends of the two optical fiber cables to align the same.

3. A connector according to claim 2, in which the means positioning said annulus for longitudinal movement comprises a resilient, longitudinally expandable bellows surrounding the end of the second optical fiber cable, means sealing one end of said bellows to said annulus at an end opposite to its tapered internal diameter, and means sealing the other end of said bellows to the casing of said male section, whereby when the connector is tightened and the frusto-conical elastic member is compressed about the opposing ends of the optical fiber cables, said resilient bellows externally seals the cable joint.

4. A connector according to claim 3, in which said bellows is in the form of a flexible rubber expandable gasket.

5. A connector according to claim 2, in which the male section of said connector casing is provided with a pair of oppositely positioned longitudinal slots, and in which the means for moving said annulus are urging the same against said frusto-conical member comprises a pair of opposed pins each attached at one end to said annulus with its respective other end extending outwardly of said casing through its respective slot, and a ring threadedly mounted about said casing in contact with the protruding ends of said pins.

6. A connector according to claim 5, in which the means positioning said annulus for longitudinal movement comprises a resilient, longitudinally expandable bellows surrounding the end of the second optical fiber cable, means sealing one end of said bellows to said annulus at an end opposite to its tapered internal diameter, and means sealing the other end of said bellows to the casing of said male section, whereby when the connector is tightened and the frusto-conical elastic member is compressed about the opposing ends of the optical fiber cables, said resilient bellows externally seals the cable joint.

7. A connector according to claim 2, in which said one end of the casing of said male section is diametrically slotted through, and in which the means for moving said annulus and urging the same against said frusto-conical member comprises a pair of diametrically opposed radially outward extensions of said annulus slidably positioned in the slotted-through portions of said casing, and a ring rotatably mounted about said casing in contact with said extensions.

8. A connector according to claim 7, in which the means positioning said annulus within the casing of the male section comprises an annular flexible ring supported at one end by the casing of said male section and extending at its other end beneath the internal surface of said annulus whereby said annular flexible ring, the internal surface of said annulus and said frusto-conical member externally seal the cable joint.

* * * * *